US008144922B2

(12) United States Patent
Kawabe et al.

(10) Patent No.: US 8,144,922 B2
(45) Date of Patent: Mar. 27, 2012

(54) TWO-DIMENSIONAL CODE WITH A LOGO

(75) Inventors: Makoto Kawabe, Saitama-ken (JP); Hidenobu Oso, Tokyo (JP); Ryusuke Saito, Tokyo (JP); Masahiro Watanabe, Tokyo (JP)

(73) Assignee: A T Communications Co., Ltd. (JP)

( * ) Notice: Subject to any disclaimer, the term of this patent is extended or adjusted under 35 U.S.C. 154(b) by 1135 days.

(21) Appl. No.: 11/787,956

(22) Filed: Apr. 18, 2007

(65) Prior Publication Data
US 2008/0002853 A1 Jan. 3, 2008

(30) Foreign Application Priority Data

Apr. 19, 2006 (JP) .................... 2006-115345
Jul. 4, 2006 (JP) .................... 2006-184020

(51) Int. Cl.
*G06K 9/00* (2006.01)
(52) U.S. Cl. .............. 382/100; 235/462.04; 235/462.09; 235/468; 235/469
(58) Field of Classification Search .......... 382/100; 235/461–469
See application file for complete search history.

(56) References Cited

U.S. PATENT DOCUMENTS

| | | | | |
|---|---|---|---|---|
| 6,256,398 B1 * | 7/2001 | Chang | ........................... | 382/100 |
| 6,565,003 B1 * | 5/2003 | Ma | .............................. | 235/462.1 |
| 6,650,776 B2 * | 11/2003 | Ihara et al. | ..................... | 382/181 |
| 6,758,399 B1 * | 7/2004 | Brunelli et al. | .......... | 235/462.01 |
| 6,938,017 B2 * | 8/2005 | Yen et al. | ....................... | 382/100 |
| 7,149,000 B1 * | 12/2006 | Sakai et al. | ................... | 358/3.28 |
| 7,207,491 B2 * | 4/2007 | Lubow | ....................... | 235/462.01 |
| 7,311,262 B2 * | 12/2007 | Hosoi et al. | .............. | 235/462.25 |
| 7,359,094 B1 * | 4/2008 | Sayuda | ......................... | 358/3.28 |
| 7,702,162 B2 * | 4/2010 | Cheong et al. | ................ | 382/232 |
| 7,809,152 B2 * | 10/2010 | Zhao et al. | ..................... | 382/100 |
| 2004/0017945 A1 | 1/2004 | Ihara et al. | | |
| 2006/0215931 A1 * | 9/2006 | Shimomukai | ................. | 382/284 |
| 2007/0051813 A1 * | 3/2007 | Kiuchi et al. | .............. | 235/462.1 |

FOREIGN PATENT DOCUMENTS

| | | |
|---|---|---|
| EP | 1154373 A2 | 11/2001 |
| JP | 11-353436 A | 12/1999 |
| JP | 2002-281275 A | 9/2002 |
| JP | 2005-316972 A | 11/2005 |
| JP | 2005-332112 A | 12/2005 |
| JP | 2006-302050 A | 11/2006 |

OTHER PUBLICATIONS

Office Action from Japanese Application No. 2006-115345 mailed Apr. 19, 2011.
European Search Report, EP 10158947, dated Aug. 26, 2011.

* cited by examiner

*Primary Examiner* — Matthew Bella
*Assistant Examiner* — Eric Rush
(74) *Attorney, Agent, or Firm* — Lerner, David, Littenberg, Krumholz & Mentlik, LLP

(57) ABSTRACT

A two-dimensional code with a logo, wherein a two-dimensional code that represents information by means of a cell dot distribution pattern formed by having a plurality of cells colored and a logo mark visually representing characters are superimposed. In a preferred embodiment, at least a part of the cell dot color area is smaller than the cell area while the two-dimensional code that represents the information by means of the cell dot distribution pattern that color codes the cells and the logo mark that visually represents the character are superimposed.

11 Claims, 9 Drawing Sheets

TWO-DIMENSIONAL CODE WITH A LOGO

The present application claims the benefit of the filing date of Japanese Application Nos. 2006-115345, filed on Apr. 19, 2006, and 2006-184020, filed on Jul. 4, 2006, disclosures of which are also incorporated herein by reference.

BACKGROUND OF THE INVENTION

1. Field of the Invention

This invention is a two-dimensional code with a logo and further pertains in detail to a two-dimensional code with a logo wherein a two-dimensional code has been added to a logo mark for representing a company or group.

2. Description of the Related Art

As exemplified in FIG. 1(a), the two-dimensional code has three positioning symbols 1a, 1b and 1c in combination with squares of specific proportions, comprising a plurality of square cells 2 between these positioning symbols 1a, 1b and 1c, and is an element in which information is recorded (cf. Japanese Published Unexamined Application No. 10-208001 as a reference example) by color coding the cells 2 with white and black (below called cell dots). This type of two-dimensional code 1 is frequently used because a great deal of information can be recorded in it as compared to a bar code.

With the above-described two-dimensional code, it is possible to scan with a reader provided in, for example, a cellular phone and because of this, URL information about, for example, a group such as a company can be obtained.

However, this type of two-dimensional code is basically a combination of white and black and even when displayed on, for example, pamphlets, it is information that people cannot understand and even when just looking at the above-mentioned two-dimensional code, it is not possible to understand what company or what group it stands for. Consequently, when displayed on, for example, pamphlets, it has the drawback of appearing to be a blemish on the design of the pamphlet or being annoying to someone just looking at it.

Recently, a method has been presented (Japan Published Unexamined Application No. 2000-123132) for a two-dimensional code representing information by means of a distribution pattern of the above-described cell 2 in which hues are expressed by means of the three colors of red, green and blue and the cell is color coded with the above-mentioned hues forming a distribution pattern.

On the other hand, the logo mark 3 shown in FIG. 1(b) is itself used as a mark to suggest a company or group, is composed of many design elements and gives an excellent visual impression. Consequently, it has the advantage that many people can visually recognize the company or group instantly but digital information is not included.

This invention is one that takes the above-mentioned problems into consideration and has as its objective providing a two-dimensional code with a logo that can at the same time represent digital information and visual information by combining a two-dimensional code that represents information by means of a distribution pattern of cell dots color coded in the cell with the logo mark.

SUMMARY OF THE INVENTION

In order to resolve the above-described problems, the two-dimensional code with the logo according to this invention is characterized by superimposing a two-dimensional code representing information by means of a distribution pattern in the cell on a logo mark that visually represents the character.

In the preferred embodiment according to this invention, the above-described a plurality of cells are separated into and colored by three or more separate hues and with one of these being taken as the reference hue the cell dots of the above-mentioned reference color represent the information pattern.

Another preferred embodiment according to this invention is one wherein an outline is set up on the border of the character of the above-mentioned logo mark and further wherein the cell that the above-mentioned outline passes through has the border of the above-mentioned outline color coded on the edge.

In the above-described preferred embodiment, this invention is characterized by a shadow which is set up in cells coated with a reference color that are adjacent to cells coated with hues beside the above-mentioned reference color.

In another preferred embodiment according to this invention, the cell dots forming an information pattern are printed with transparent infrared absorbing ink. Furthermore, in such an embodiment when there is a letter part, a diagram part and a background part and the letter part and the diagram part are superimposed, the above-mentioned characters have only the cell dots of the above-mentioned letter part and background part printed with the above-mentioned infrared absorbing ink. Additionally, when having a letter part, a diagram part and background part and when the letter part and diagram part are superimposed, the above-mentioned character is one wherein only the cell dots of the diagram part are printed with the infrared absorbing ink.

In addition to having the two-dimensional code representing information by means of the distribution pattern of the cell dots coated in the cells superimposed with the logo mark visually representing the character, the two-dimensional code with the logo according to this invention and further its preferred embodiment is one wherein at least a part of the above-mentioned cell dot color area is smaller than the area of the cell.

In the above-described embodiment, the cell dots in which the above-mentioned color area is smaller than the cell area are dots wherein the center of the above-mentioned cell is colored with the prescribed color in 3% or more of the cell area and are dots in which the above-mentioned color area is smaller than the cell area that are of a geometric shape. Additionally, the cell dots whose above-mentioned color area is smaller than the cell area are characterized by an indefinite shape. Also, in this embodiment the part that is outside of the above-mentioned cell dots of the cells that have cell dots in which the color area is smaller than the area of the cell is one wherein colors are applied that differ from the above-mentioned cell dots.

BRIEF DESCRIPTION OF THE DRAWINGS

FIG. 13 is a plane diagram of the third embodiment of this invention.

DETAIL DESCRIPTION OF THE PREFERRED EMBODIMENTS

Figure 1:
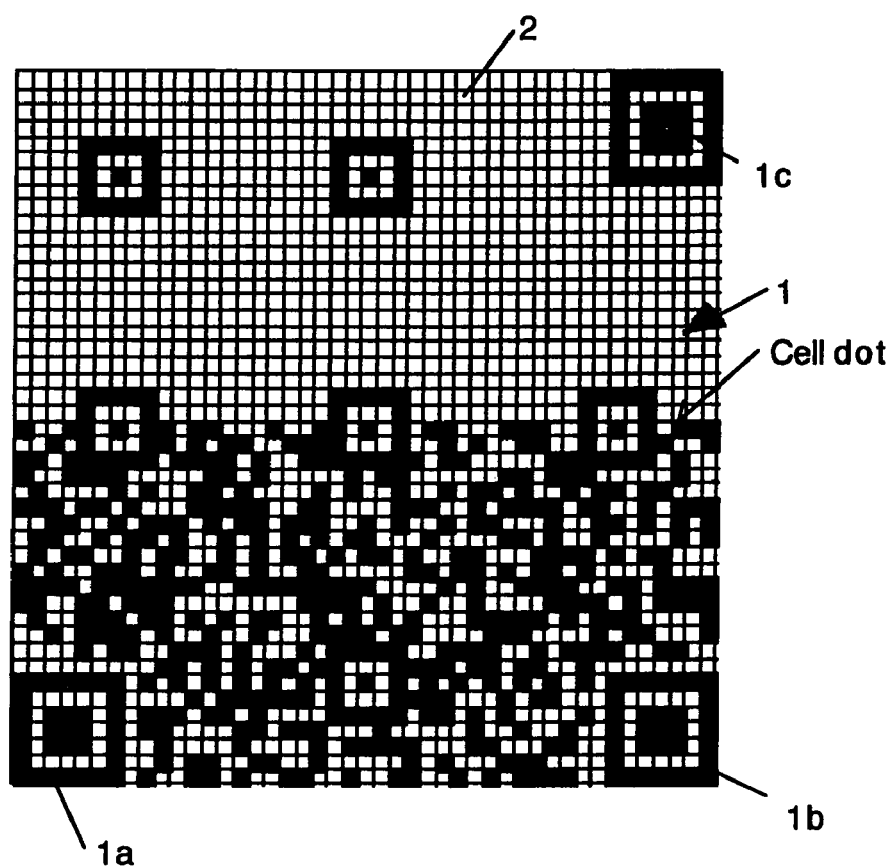
FIGS. 1A and 1B show plane diagrams of the two-dimensional code (one part) and the logo used in this invention.
Figure 1:
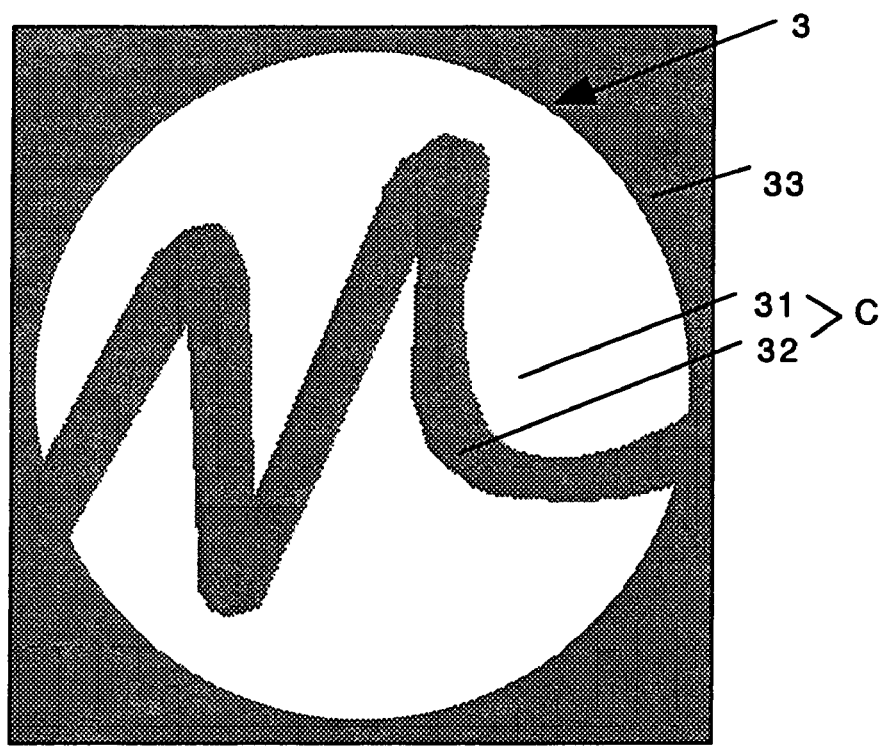
Figure 2:
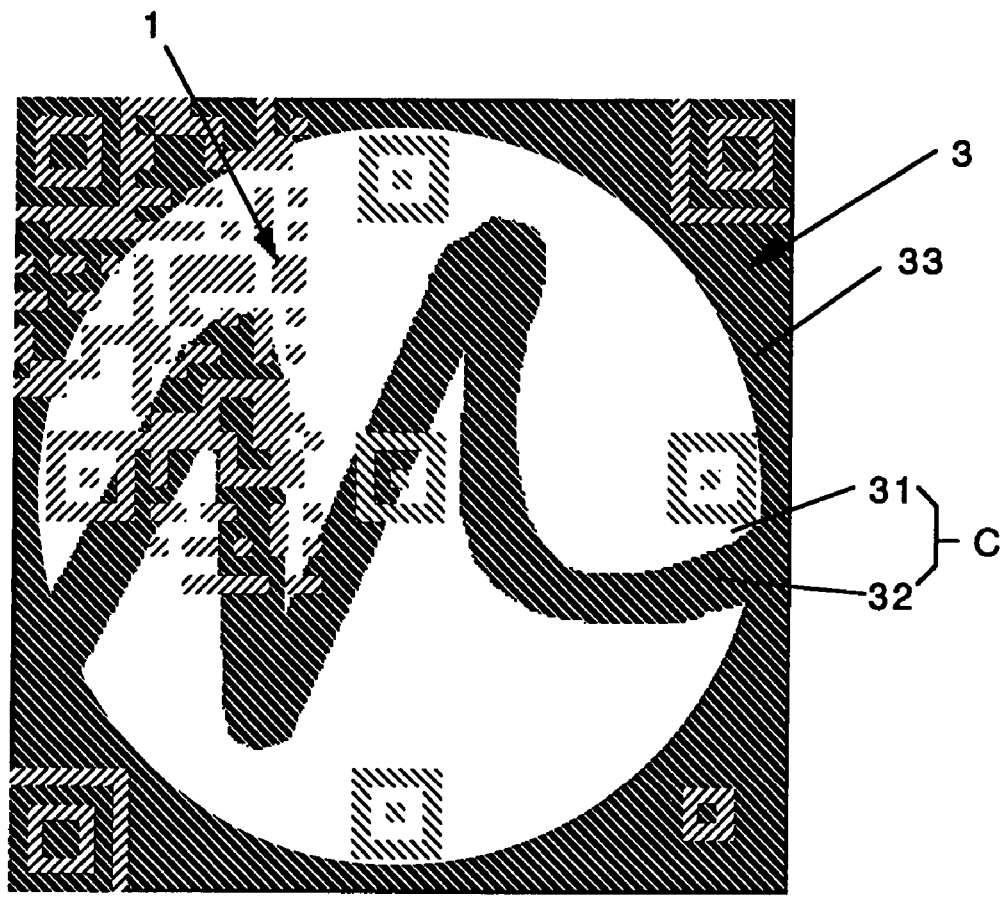
FIG. 2 is a plane diagram of one embodiment of this invention.

FIG. 1B is a plane diagram of the logo mark 3 and as clarified in FIG. 1B, the character C expressing, for example, the group name of the logo mark 3 has an outlined circular part (diagram part) 31 on a colored background and a letter part (M in this embodiment) 32 displayed in this circular part and in this invention as shown in FIG. 2, the two-dimensional code formed by the information pattern is superimposed (only a part of the two-dimensional code is shown) on this logo mark 3. In this embodiment the letter part 32 is the same color as the background part 33 outside of the circular part 31 in this logo mark 3, and the circular part 31 is outlined on the colored background. As shown in FIG. 1A, the cell 2 of the two-dimensional code 1 is color coded in black and white and the information pattern of the two-dimensional code is indicated in two colors.

In the above-described embodiment, there is the drawback that the border of the letter part 32 and the circular part 31 is eroded by the hue (black: reference color) of the two-dimensional code cell 2 and the logo mark 3 has become difficult to see.

Figure 3:
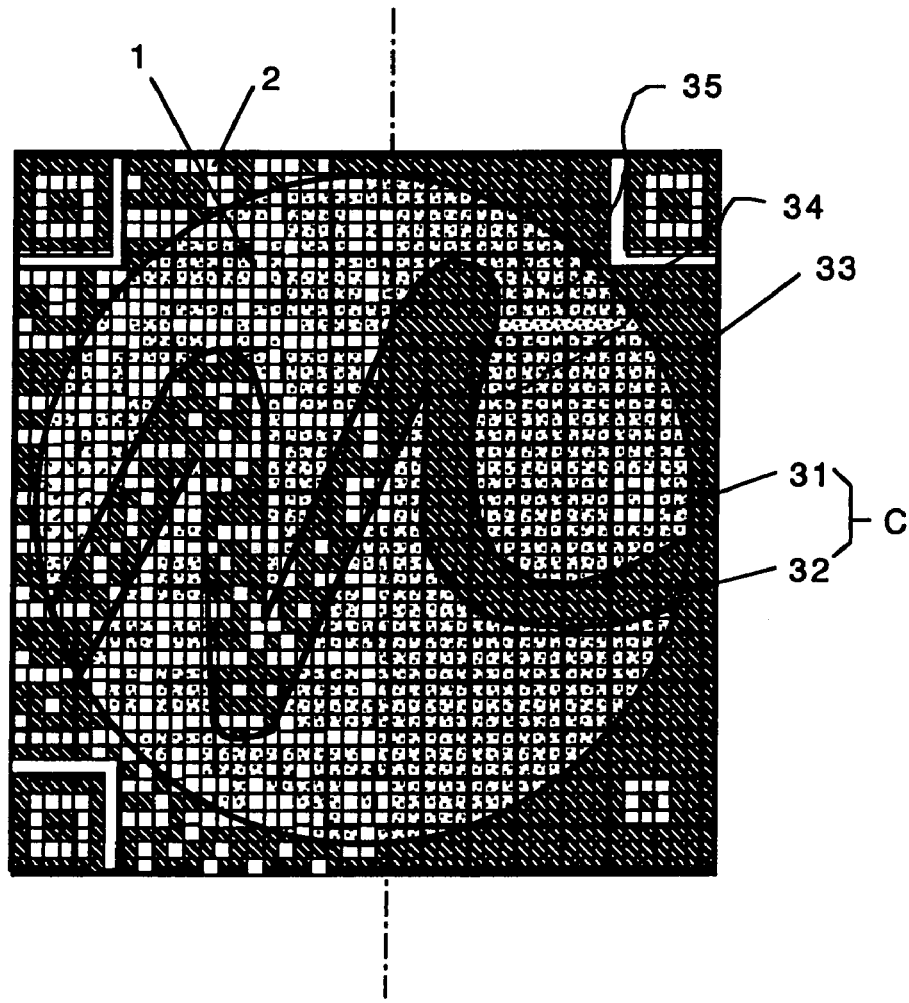
FIGS. 3A and 3B are plane diagrams of another embodiment of this invention and is a pattern diagram showing the state of the cells.
Figure 3:
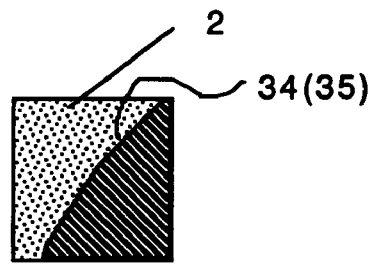

FIG. 3 is the second embodiment according to this invention and as can be more clearly seen from this diagram, in this embodiment an outline along the border of at least the character C of the logo mark 3 has been set up. That is, the outlines 34 and 35 have been set up along the borders of the circular part 31 and the letter part 32 and the character C composed of the circular part 31 and the letter part 32 have come out in relief. Consequently, visibility to the naked eye has improved.

In this embodiment, the white part represents the black color in the above-described first embodiment and represents the information pattern due to the above-mentioned white part (reference color). In this case, the above-mentioned a plurality of cells are divided into and colored by three or more colors and with one of them being the reference color the cell dots of the above-mentioned reference color represent the information pattern. That is, because of the white part (reference color) and the other colors the information is recorded in binary form.

The information pattern becomes disorganized due to the above-described outline and even if there is approximately 30% damage in this type of two-dimensional code, because reading is possible (cf. Japanese Published Unexamined Application No. 10-208001), there is no hindrance to reading of the two-dimensional code by means of the reader. Furthermore, as shown in FIG. 3B, even if the cell is color coded with a different color on the edge of the outline 34 or 35, the information pattern is expressed because of the reference white color part (reference color) so that it is possible to effectively read the digital information.

Figure 4:
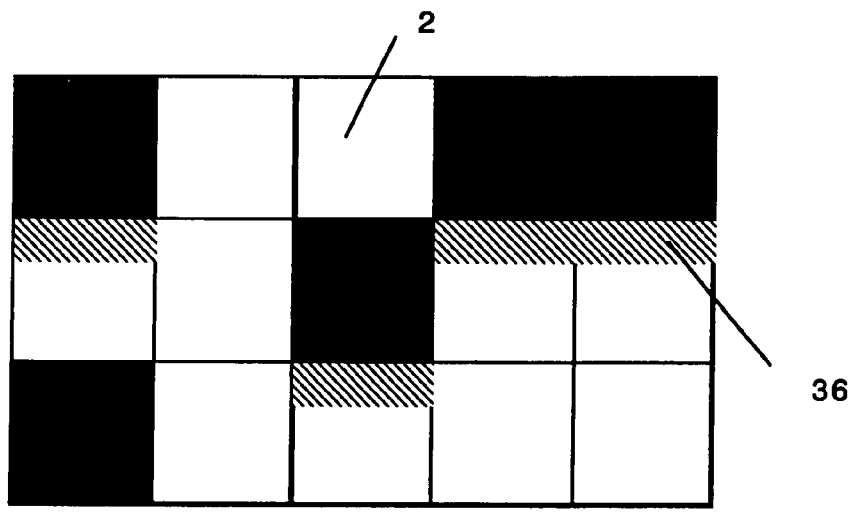
FIG. 4 is a pattern diagram of the shadow part of the cells of this invention.

As shown in FIG. 4, in the preferred embodiment according to this invention it is possible to set up a shadow 36 in a hue beside the white color. That is, it is possible to set up a shadow on a cell coated in a reference color adjacent to a cell coated with a hue beside the above-mentioned reference color. By setting up this type of shadow 36, it is possible to make a sharp contrast between the cell dot of the cell 2 beside the above-mentioned white color and the cell dot of the cell 2 of the white color and to be able to scan easily with a reader.

Figure 5:
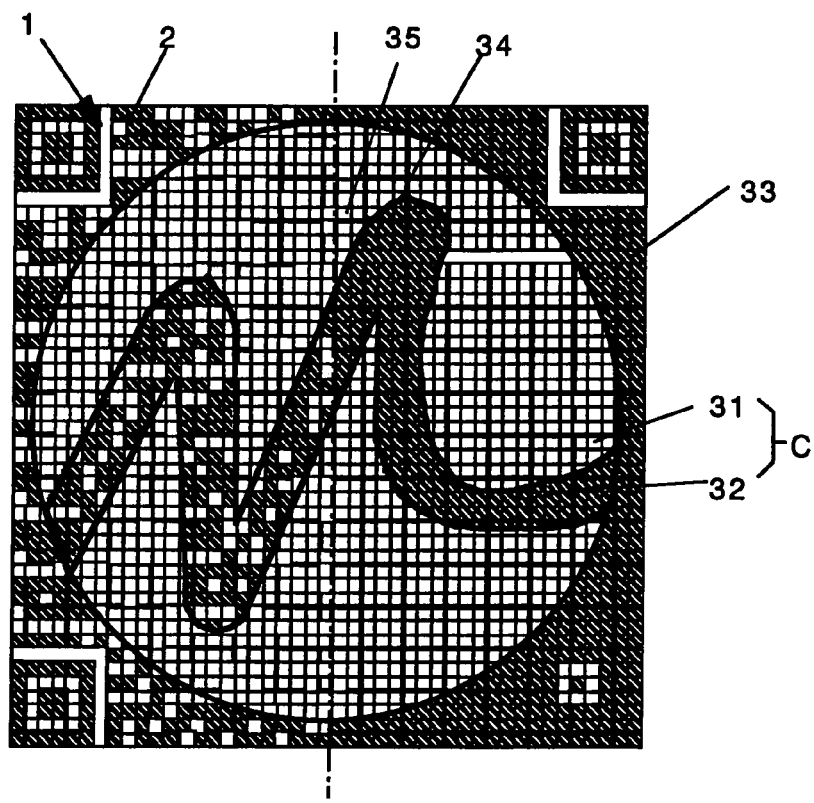
FIG. 5 is a plane diagram of another embodiment of this invention.

FIG. 5 is a plane diagram of the third embodiment according to this invention and as clarified by this diagram, in the part with the exception of the letter part 32 in the circular part 31, the cell dots cannot be seen. The cells 2 of this part have been color coded by infrared absorbing ink (cf. Japanese Published Unexamined Application No. 6-107985) and the cell dots formed in this manner. Because the above-mentioned infrared absorbing ink is transparent, with the exception of the letter part 32 and the background part 33, the cell dots cannot be seen. By using this type of infrared absorbing ink, it is difficult to see the cell dots in any part except the letter part 32 in the above-mentioned circular part 31. However, reading is possible with an infrared reader provided in devices such as a mobile phone and it is a simple matter to obtain digital information.

Figure 6:
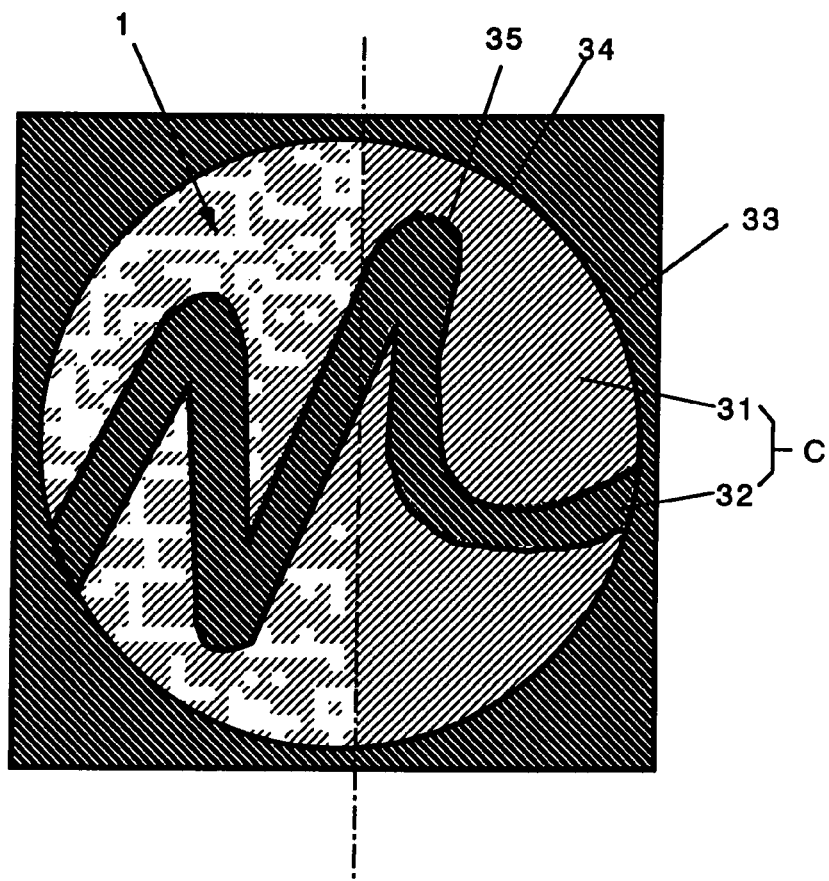
FIG. 6 is a plane diagram of another embodiment of this invention.

FIG. 6 is a plane diagram of one aspect of the above-mentioned third embodiment and according to this embodiment the cell dots are printed with the above-described infrared absorbing ink on the letter part 32 and the background part 33 and the part with the exception of the letter part 32 in the above-mentioned circular part 31 is colored with the same color (for this case, when the color is white, the background part may not be displayed) and a structure is formed in which the cell dots are white. In the above-described embodiment there are times when the cells with the color that is the reference are basically all colored with the reference color but even for those cases when the above-mentioned cells are not colored with the basic color, it is possible to read the two-dimensional code.

Figure 7:
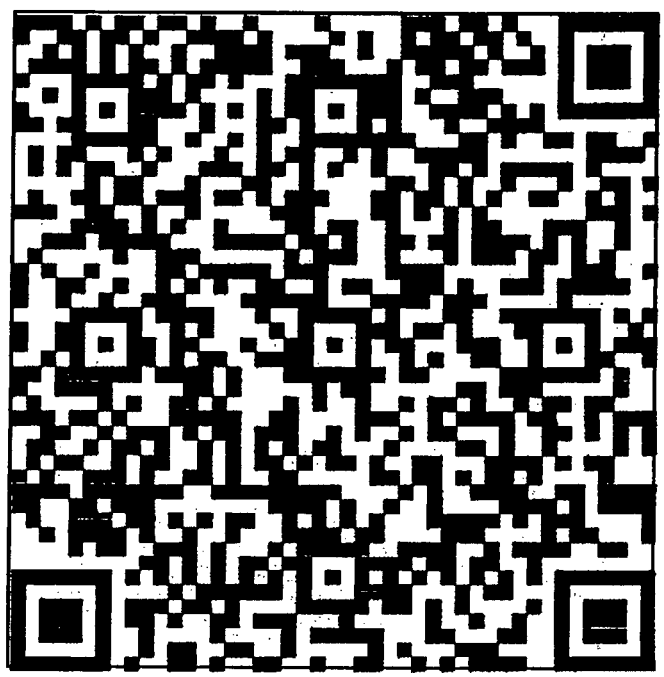
FIG. 7 is a plane diagram of the two-dimensional code.
Figure 8:
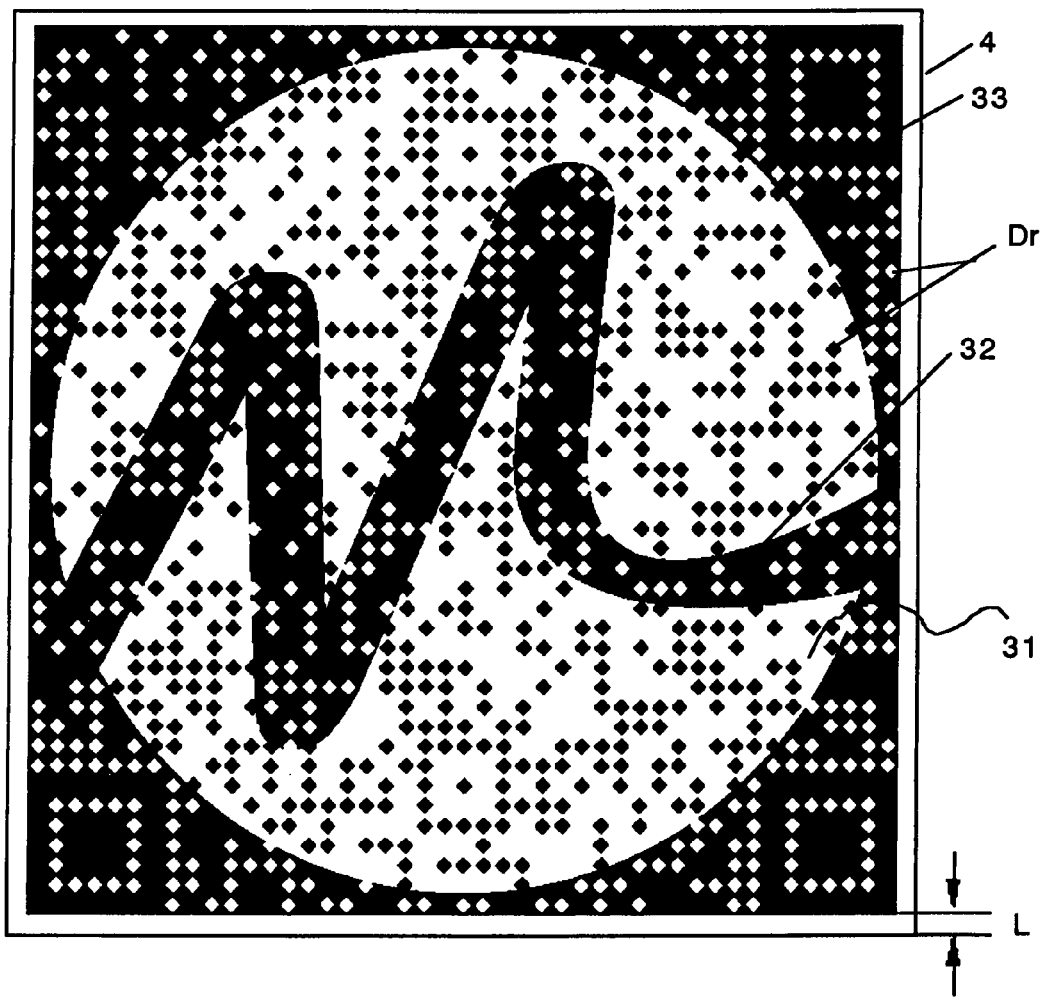
FIG. 8 is a plane diagram of an embodiment of this invention.

FIG. 8 is a plane diagram showing an embodiment of this invention when using the element shown in FIG. 7 as the two-dimensional code (using the element in FIG. 1B as the logo mark). This two-dimensional code is comprised of 4 mm square cells in 45×45 rows.

Figure 9:
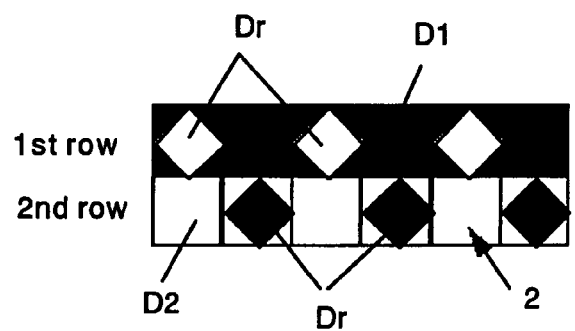
FIG. 9 is an explanatory diagram showing the state of the cells in the above-mentioned embodiment.

As clarified by FIG. 8, in the above-mentioned logo mark 3, the letter part 32 and the background part 33 are the same color (in FIG. 8 they are black but other colors may also be used), the circular part 31 is colored in white and the white color is the reference color. Some of the cell dots D coloring the cells 2 are the diamond shaped cell dots Dr and do not completely color the square cells 2. That is, the colored area of the diamond shaped cell dots Dr is smaller than the area of the cells 2. This state is shown in pattern form in FIG. 9. As clearly shown in FIG. 9, the area of the cell dots Dr in this embodiment are ½ the area of the cells 2 (Fourth embodiment).

The above-mentioned diamond shaped cell dots Dr in this embodiment are colored with black and white. As clarified in FIG. 8, because the letter part 32 and the background part 33 are colored in black, the diamond shaped cell dots Dr are colored in white (cf. the first row of FIG. 5) and because the circular part 31 is colored in white, the letter part 32 is colored in black (cf. the second row of FIG. 5).

Figure 10:
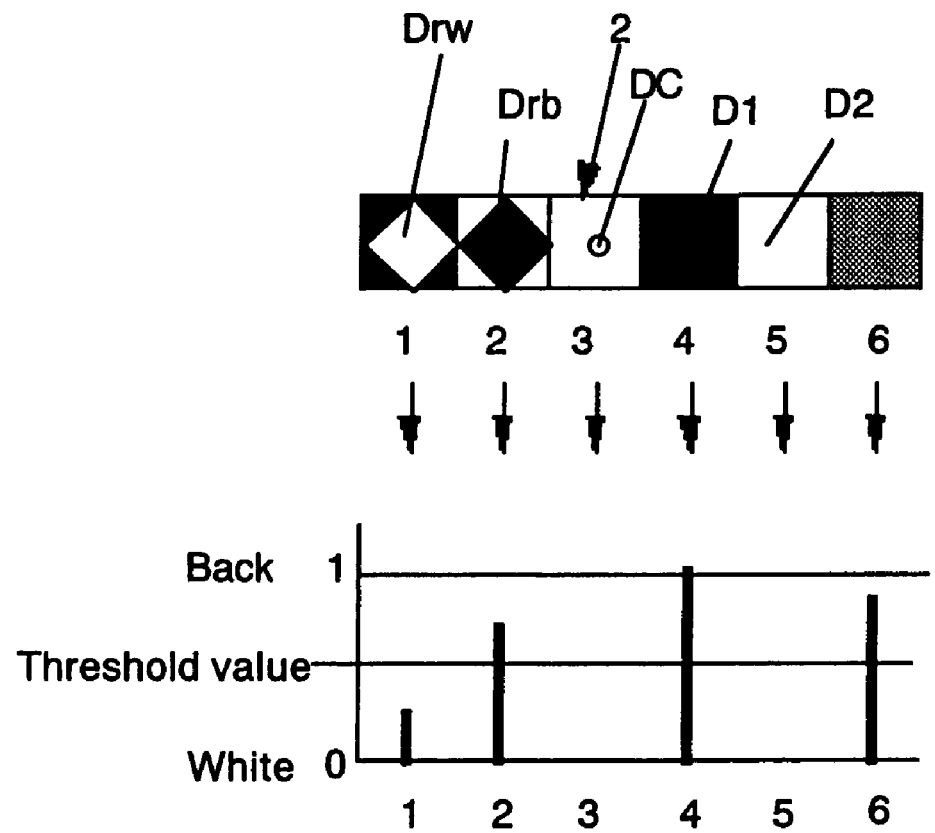
FIG. 10 is a diagram illustrating the reading mechanism of the reader.

For this case, the part outside of the diamond shaped cell dots Dr in the cells 2 is colored with a different color (black or white) (cf FIG. 10).

For the other cells 2 not colored with the diamond shapes as, for example, the cells 2 of the letter part 32 and the background part 33, the cells that are not to be colored in white become the cell dots D1 which are completely colored in black and the cells which are not to be colored with the black color of the circular part 31 become the cell dots D2 colored in white. As a result, the cell dots which can be seen as the two-dimensional code cell dots become only the diamond shaped cell dots Dr and the logo mark 3 is easy to discern.

For the above-described two-dimensional code structure, FIG. 10 is a diagram illustrating a possible reading mechanism that can be scanned with a reader. The above-mentioned reader is a mechanism for scanning the center part DC (refer to the third cell) of the cell 2 and it can detect, for example, what the shape is that can be read.

When the entire cell is colored in black as is the $4^{th}$ cell in FIG. 10 and the reader recognizes it as, for example, 1 and when the entire cell is colored in white as in the $5^{th}$ cell and is recognized as 0, even though, for example, the white diamond shaped cell dot Drw shown in the $1^{st}$ cell 2 of FIG. 10 is different from the above-mentioned $5^{th}$ cell and a value is taken that is recognized as being black to a certain degree as shown in the graph, the threshold value of the reader when lower than the above-mentioned value is recognized as 0 for white. Conversely, even though the diamond shaped black cell dot Drb shown in the $2^{nd}$ cell 2 differs from the above-mentioned $4^{th}$ cell and a value is taken that is recognized as being white to a certain degree as shown in the graph, the threshold value of the reader is higher than the above-mentioned value and it is recognized as 1 for black.

Furthermore, because, as described above, the above-mentioned reader is a structure for scanning the center part DC (cf. the $3^{rd}$ cell) in the cell 2, even if the area of the above-mentioned cell dot is, for example, one half of the diamond shape, the reader does not indicate the one half value and a value is taken that to a certain extent is high (a value recognized as black).

Consequently, if a cell dot is formed around DC, the center of the cell 2, reading can be easily performed even if the area is small. When forming a cell dot around DC, the center of the cell 2 and it is 3% or more of the area of the cell 2, it can be easily scanned with the reader in a mobile phone. The area of the cell 2 preferably is 20% or more.

Furthermore, in the two-dimensional code with the logo according to this invention the margin 4 as shown in FIG. 8 colored in white is set up outside of the two-dimensional code with the logo. When the width L of this margin 4 is less than 50% of the length of the width or height of the cell 2, scanning with the reader becomes difficult (it is the same in the embodiment below but it is omitted in the diagrams).

Figure 11:
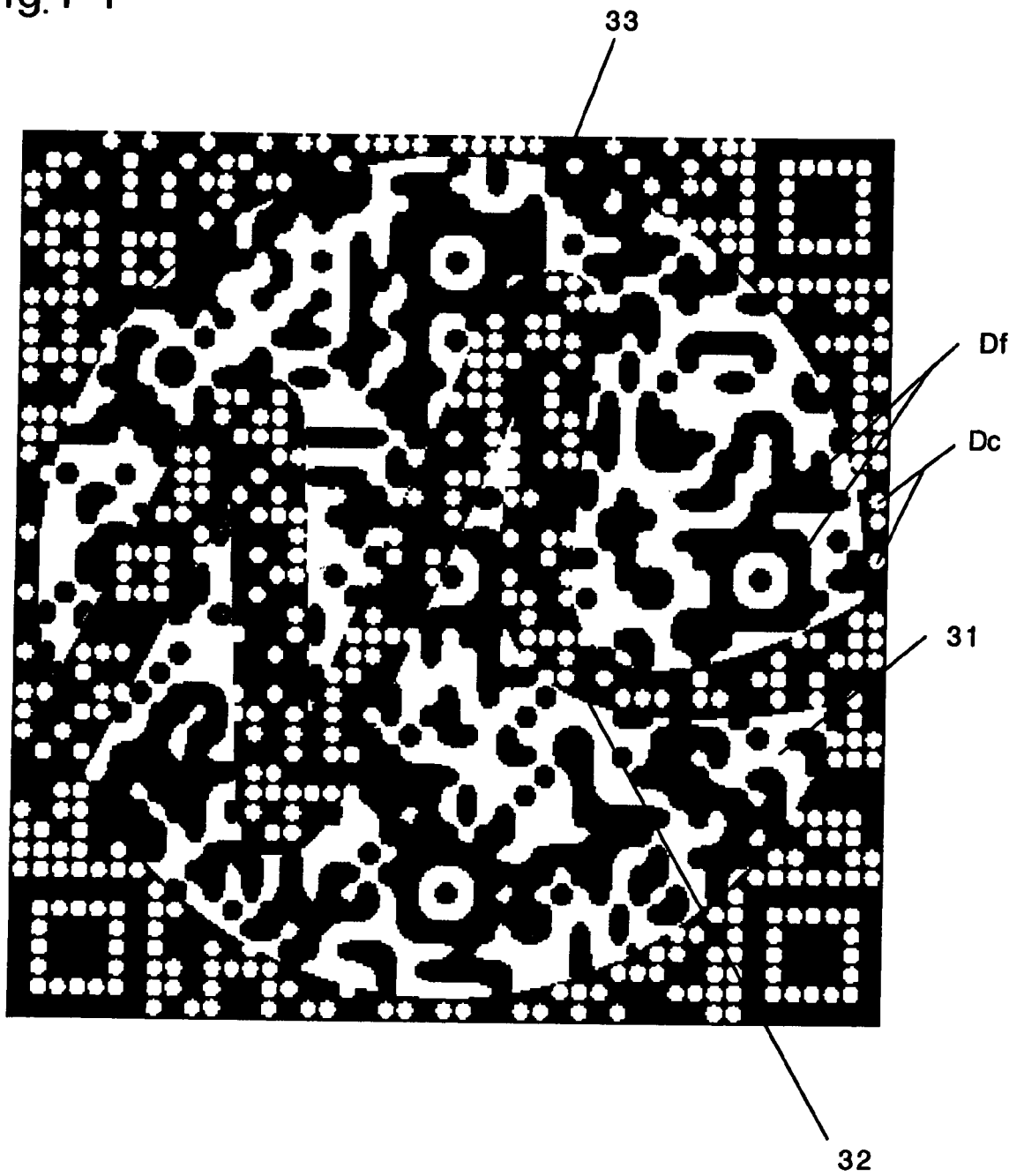
FIG. 11 is a plane diagram of the second embodiment of this invention.
Figure 1:
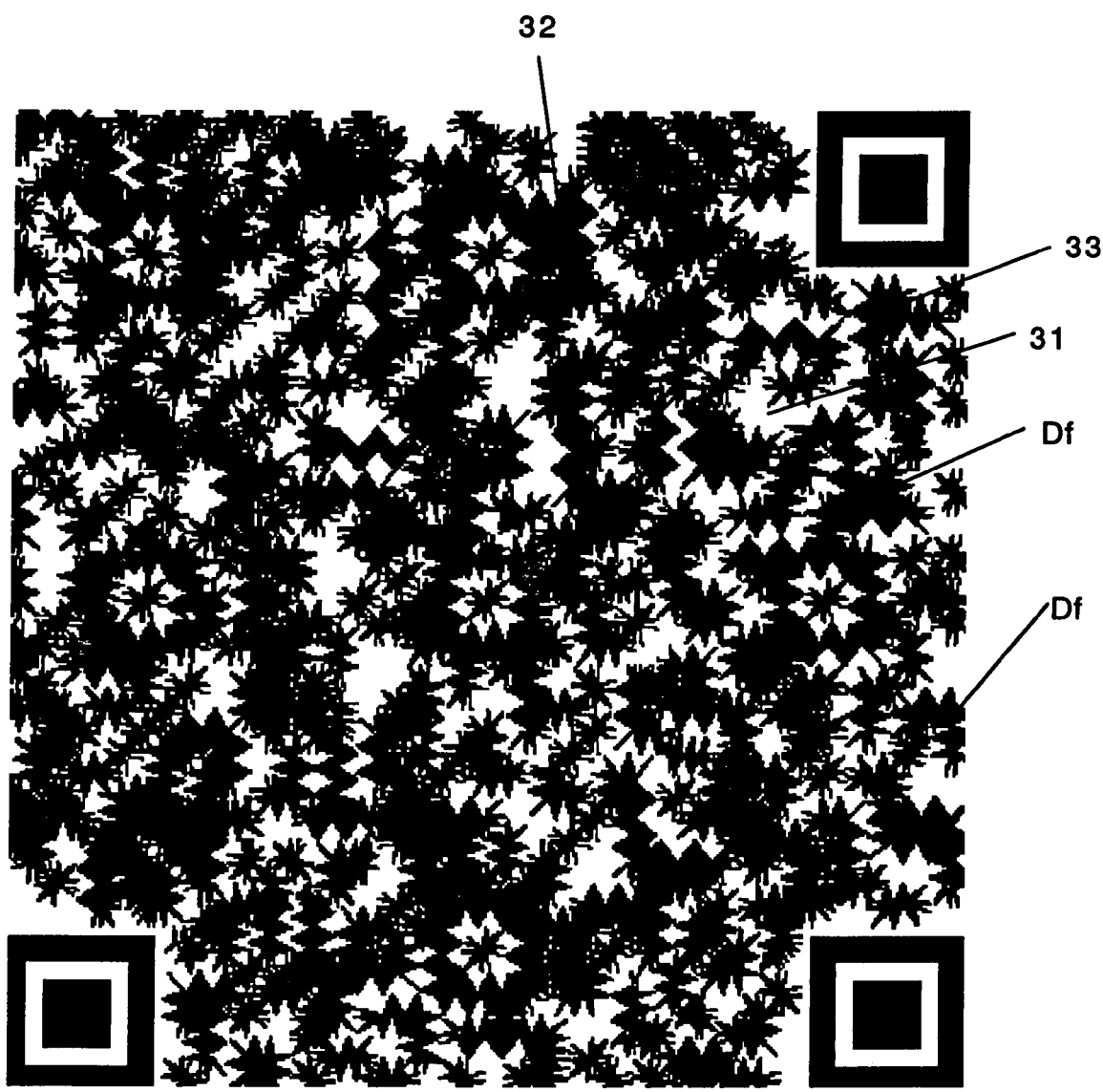

FIG. 11 is a plane diagram of the $5^{th}$ embodiment according to this invention. The two-dimensional code 1 of FIG. 7 is also used in this embodiment and the element of FIG. 1(b) is used as the logo mark 3. The cells in this embodiment have the same dimensions and the same cell number as the above-described embodiments.

This embodiment has circular cell dots Dc. These circular cell dots DC are circles inscribed in the square cells 2 and do not completely color the cells 2. Even in this embodiment the letter part 32 and the background part 33 are formed with the same color and the circular part 31 is formed in white.

The remaining cell part outside of the color of the circular cell dots Dc in a similar manner in this embodiment is colored with a different color. According to the above-mentioned FIG. 11, the letter part 32 and the background part 33 are colored in black and the circular cell dots Dc of these parts are colored in white and the remaining cell parts are colored in black. In this embodiment, the circular part 31 is white as described above but the cell dot Df is indefinite shaped and is colored other than by white or black. Even for a color other than black, when the value is larger than the above-mentioned threshold value as in the $6^{th}$ cell of FIG. 9, it is recognized as 1 and there is no obstacle to transmitting the information of the two-dimensional code. Consequently, in the above-described $1^{st}$ embodiment and in this embodiment, even if the letter part 32 and the background part 33 which are in black are colored with a hue other than black, it is clear that there is no obstacle to transmitting information.

In the above-describe $1^{st}$ and $2^{nd}$ embodiments, circular and diamond shaped cell dots are used but it is clearly possible to effectively use other geometric shapes with the cells such as, for example, squares or hexagons or other similar shapes.

Figure 12:
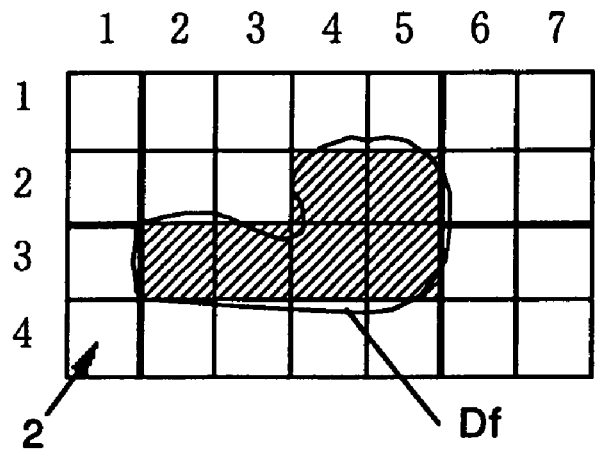
FIG. 12 is an explanatory diagram of the indefinite shaped cell dots.

FIG. 12 is a diagram illustrating in pattern form the above-mentioned indefinite shaped cell dots Df and when desiring to have cell information indicated by oblique lines expressed in the two-dimensional code, conventionally the cell numbers (indicating the width-height numbers) 4-2, 5-2, 2-3, 3-3, 4-3 and 5-3 would be colored in black and the others colored in white. However, in this embodiment, the cell dot Df is formed indicated by a heavy line and the colors the inside of the cell dot Df is colored with the prescribed color. For instance, just because the cell with the cell number 4-2 is not completely surrounded with the heavy line of the cell dot Df, this does not mean that the complete cell is colored. However, because most of the central portion in the center is colored, the color information 1 is indicated. Because, in cell 4-1, part is enclosed with the heavy line of the cell dot Df, that part is colored but because the central portion of the cell is white in the center, as clearly explained in FIGS. 9 and 10, 0 as the information is indicated. Consequently, even with this type of indefinite shaped cell dot Df, the information of the two-dimensional code becomes readable.

FIG. 13 is the $6^{th}$ embodiment of this invention and the same two-dimensional code as in FIG. 7 and the same logo mark as indicated in FIG. 1(b) are used. The dimensions and number of cells are the same as in the above-described $1^{st}$ and $2^{nd}$ embodiments. According to this embodiment, the cell dots Df make up various indefinite shapes and the cells outside of the white color are formed only with the indefinite cell dots Df explained in FIG. 12 (as a result, the white cell dots may be also indefinitely shaped). This type of two-dimensional code with a logo also presents no problem and can be read by a mobile phone.

In fact, in embodiments 4 through 6, when the parts expressed in black in the diagrams are blue and in embodiments 5 and 6 the other colored parts are ocher, they were readable by a reader in mobile phones.

In the above-described embodiments 4 through 6 of this invention, an outline on the border of the character C of the above-mentioned logo mark may be set up and in their preferable aspects, the cells that the above-mentioned outline passes through have the border of the above-mentioned outline color coded on the edge. Furthermore, a plurality of cells forming the information pattern may be colored by three or more colors with one of them taken as the reference color and the cell dots of the above-mentioned reference color may also represent the information pattern. In this aspect, it is preferable for the reference color representing the information pattern to be white.

In the above-described embodiments 4 through 6 of this invention, shadows may be set up in the cells coated with the above-mentioned reference color adjacent to the cells coated with a hue other than the reference color.

In the above-described aspect according to this invention, the cell dots forming the information pattern are characterized by being printed with transparent infrared absorbing ink.

In this aspect, the said character is composed of a letter part, a diagram part and a background part and when the letter part and the diagram part are superimposed, only the cell dots of the above-mentioned letter part and background part are printed with the above-mentioned infrared absorbing ink. Furthermore, in aspects other than this, the letter part only may be formed with the above-mentioned infrared absorbing ink.

What is claimed is:

1. A method for generating a two-dimensional code with a logo, comprising:
    superimposing the two-dimensional code that represents information using a cell dot distribution pattern formed by having a plurality of colored cells on a visually recognizable logo mark;
    superimposing a cell dot whose brightness is lower than a predetermined brightness on a part of the logo mark whose brightness is equal to or higher than the predetermined brightness; and
    superimposing a cell dot whose brightness is equal to or higher than the predetermined brightness on a part of the logo mark whose brightness is lower than the predetermined brightness such that information is represented by means of a distribution pattern of the cell dot whose brightness is equal to or higher than the predetermined brightness and the part of the logo mark whose brightness is equal to or higher than the predetermined brightness, and the cell dot whose brightness is lower than the predetermined brightness and the part of the logo mark whose brightness is lower than the predetermined brightness, and
    wherein the cell dots which form an information pattern are printed with transparent infrared absorbing ink,
    the logo mark comprising a letter part, a diagram part and a background part, wherein, when the letter part and the diagram part are superimposed, only the cell dots of the letter part and the background part are printed with the infrared absorbing ink.

2. The method for generating the two-dimensional code with the logo according to claim 1, wherein a plurality of cells are separated into and colored by three or more hues with one among them being a reference color and the cell dots of the reference color represent an information pattern.

3. The method for generating the two-dimensional code with the logo according to claim 2, wherein a shadow is set up on a cell coated by a reference color adjacent to a cell coated with a hue other than the reference hue.

4. The method for generating the two-dimensional code with the logo according to claim 1, wherein the cell that the outline passes through is color coded with the boundary of the outline as an edge.

5. The method for generating the two-dimensional code with the logo according to claim 1, wherein the cell dots which form an information pattern are printed with transparent infrared absorbing ink.

6. The method for generating the two-dimensional code with the logo according to claim 1, wherein at least a colored area of at least a part of the cell dot is smaller than a whole area of one cell.

7. The method for generating the two-dimensional code with the logo according to claim 6, wherein the cell dot in which the colored area is smaller than the cell area is colored around a center of the cell with a prescribed color in 3% or more of the cell area.

8. The method for generating the two-dimensional code with the logo according to claim 6, wherein the cell dot in which the colored area is smaller than the cell area is in a geometric shape.

9. The method for generating the two-dimensional code with the logo according to claim 6, wherein the cell dot with the colored area smaller than the cell area is of an indefinite shape.

10. The method for generating the two-dimensional code with the logo according to claim 6, wherein a part other than the cell dot of the cell which has a cell dot in which the colored area is smaller than the cell area is colored with a color different from the cell dot.

11. A method for generating a two-dimensional code with a logo, comprising:
    superimposing the two-dimensional code that represents information using a cell dot distribution pattern formed by having a plurality of colored cells on a visually recognizable logo mark;
    superimposing a cell dot whose brightness is lower than a predetermined brightness on a part of the logo mark whose brightness is equal to or higher than the predetermined brightness; and
    superimposing a cell dot whose brightness is equal to or higher than the predetermined brightness on a part of the logo mark whose brightness is lower than the predetermined brightness such that information is represented by means of a distribution pattern of the cell dot whose brightness is equal to or higher than the predetermined brightness and the part of the logo mark whose brightness is equal to or higher than the predetermined brightness, and the cell dot whose brightness is lower than the predetermined brightness and the part of the logo mark whose brightness is lower than the predetermined brightness, and
    wherein the cell dots which form an information pattern are printed with transparent infrared absorbing ink,
    the logo mark comprising a letter part, a diagram part and background part, wherein when the letter part and the diagram part are superimposed, only the cell dots of the diagram part are printed with the infrared absorbing ink.

* * * * *